United States Patent
Shur et al.

(10) Patent No.: US 8,135,750 B2
(45) Date of Patent: Mar. 13, 2012

(54) EFFICIENTLY DESCRIBING RELATIONSHIPS BETWEEN RESOURCES

(75) Inventors: Andrey Shur, Redmond, WA (US); Bruce A. MacKenzie, Sammamish, WA (US); Charles S. Walker, Sammamish, WA (US); David B. Ornstein, Seattle, WA (US); Jerry J. Dunietz, Seattle, WA (US); Joshua M. Pollock, Seattle, WA (US); Sarjana B. Sheth, Redmond, WA (US); Isaac E. Nichols, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/111,882

(22) Filed: Apr. 22, 2005

(65) Prior Publication Data
US 2006/0242184 A1 Oct. 26, 2006

(51) Int. Cl.
 *G06F 17/30* (2006.01)
(52) U.S. Cl. .......................... 707/794; 707/803; 715/234
(58) Field of Classification Search .................. 707/103, 707/794, 809, 802, 803; 715/234
See application file for complete search history.

(56) References Cited

U.S. PATENT DOCUMENTS

| | | | |
|---|---|---|---|
| 5,291,583 A * | 3/1994 | Bapat | 717/137 |
| 6,028,279 A | 2/2000 | Suryan | |
| 6,108,783 A * | 8/2000 | Krawczyk et al. | 713/180 |
| 6,233,606 B1 | 5/2001 | Dujari | |
| 6,266,682 B1 * | 7/2001 | LaMarca et al. | 715/501.1 |
| 6,275,829 B1 | 8/2001 | Anglulo | |
| 6,442,554 B1 * | 8/2002 | Reddy et al. | 707/794 |
| 6,462,756 B1 | 10/2002 | Hansen et al. | |
| 6,549,773 B1 | 4/2003 | Linden et al. | |
| 6,581,062 B1 * | 6/2003 | Draper et al. | 707/100 |
| 6,591,260 B1 | 7/2003 | Schwarzhoff et al. | |
| 6,691,119 B1 | 2/2004 | Lippert et al. | |
| 6,766,329 B1 * | 7/2004 | Nicholson | 707/102 |
| 6,804,677 B2 * | 10/2004 | Shadmon et al. | 707/101 |
| 6,944,658 B1 | 9/2005 | Schneider | |
| 7,010,568 B1 | 3/2006 | Schneider et al. | |
| 7,010,580 B1 | 3/2006 | Fu et al. | |

(Continued)

FOREIGN PATENT DOCUMENTS

EP 1126387 A2 8/2001

OTHER PUBLICATIONS

DuCharme, Namespace and XLST Stylesheets, XML, 2001.*

(Continued)

*Primary Examiner* — Sherief Badawi
(74) *Attorney, Agent, or Firm* — Shook, Hardy & Bacon L.L.P.

(57) ABSTRACT

A relationship data structure associated with a source resource enables methods to discover and describe relationships between the source resource and a plurality of target resources. The relationships are stored in a format independent of the encoding of the source resource. Each relationship between the source resource and the plurality of target resources is stored in a content-neutral format, and the relationship data structure stores, a location of each target resource, a type of relationship with each target resource and an identifier to uniquely identify each relationship between the source resource and each target resource. Accordingly, the relationship data structure allows a decoder to directly discover the relationships between the source resource and the plurality of target resources without decoding the source resource or target resources.

16 Claims, 5 Drawing Sheets

U.S. PATENT DOCUMENTS

| | | |
|---|---|---|
| 7,310,646 B2 | 12/2007 | Rangadass |
| 2002/0062320 A1 | 5/2002 | Shimojima et al. |
| 2002/0165872 A1 | 11/2002 | Meltzer et al. |
| 2003/0004971 A1 | 1/2003 | Gong et al. |
| 2003/0112792 A1 | 6/2003 | Cranor et al. |
| 2003/0126128 A1 | 7/2003 | Watson |
| 2003/0182305 A1 | 9/2003 | Balva et al. |
| 2003/0204529 A1 | 10/2003 | Hertling et al. |
| 2003/0204670 A1 | 10/2003 | Holt et al. |
| 2004/0098461 A1 | 5/2004 | Dennis |
| 2004/0230900 A1 | 11/2004 | Relyea |
| 2004/0250246 A1* | 12/2004 | Veselov et al. ............... 717/169 |
| 2005/0021541 A1 | 1/2005 | Rangadass et al. |
| 2005/0050068 A1* | 3/2005 | Vaschillo et al. ............ 707/100 |
| 2005/0074018 A1 | 4/2005 | Zintel et al. |
| 2005/0076296 A1 | 4/2005 | Lee et al. |
| 2005/0091575 A1 | 4/2005 | Relyea |
| 2005/0091576 A1 | 4/2005 | Relyea |
| 2005/0108628 A1 | 5/2005 | Grambihler |
| 2005/0154976 A1* | 7/2005 | Nelson ......................... 715/513 |
| 2005/0188203 A1 | 8/2005 | Bhaskaran |
| 2005/0273704 A1 | 12/2005 | Dunietz |
| 2006/0004854 A1* | 1/2006 | Okunseinde et al. ..... 707/103 Y |
| 2006/0010374 A1 | 1/2006 | Corrington |
| 2006/0265640 A1 | 11/2006 | Albornoz |

OTHER PUBLICATIONS

RDF/XML Syntax Specification (Revised) W3C Recommendation Feb. 10, 2004 [online]. World Wide Web Consortium (W3C), [retrieved on Apr. 22, 2005]. Retrieved from the Internet: <URL: www.w3.org/TR/2004/REC-rdf-syntax-grammar-20040210/>.

RDF Primer W3C Recommendation Feb. 10, 2004 [online]. World Wide Web Consortium (W3C), [retrieved on Apr. 22, 2005]. Retrieved from the Internet: <URL: www.w3.org/TR/rdf-primer>.

Resource Description Framework (RDF): Concepts and Abstract Syntax W3C Recommendation Feb. 10, 2004 [online]. World Wide Web Consortium (W3C), [retrieved on Apr. 22, 2005]. Retrieved from the Internet: <URL: www.w3.org/TR/rdf-conepts/>.

International Search Report dated Oct. 11, 2007.

Uche Ogbuji, "Thinking XML: The open office file format, An XML format for front office documents", IBM developerWorks, pp. 1-4, published on Jan. 1, 2003, http://www.ibm.com/developerworks/xml/library/x-think15/.

"RFC 2396-Uniform Resource Identifier (URI): Generic Syntax ". Xerox corporation, Aug. 1998; T. Berners-Lee et al.

International search Report dated Nov. 19, 2007.

"Dennis, Anita, Real World PDF with Adobe Acrobat 5, Dec. 13, 2001, Peachpit Press, Chapters 1-22,http://proquest.safaribooksonline.com/02OI758946".

"*Adobe Acrobat* vs. *Adobe Acrobat Reader*, Last post Aug. 29, 2004 http://software-robotics.com/graphic-designprepress/viewtopic.php?t=169".

Acrobat Family, archived Feb. 6, 2004 (C) 2004 http://www.adobe.com/products/acrobat/matrix.html.

"Northover, Steve and Mike Wilson, SWT: The Standard Widget Toolkit, vol. 1, Jun. 28, 2004 Addison Wesley Professional, "Introduction" Found on Safari Books Online".

"Using Windows XP Visual Styles, MSDN May 2001, Archived Apr. 10, 2003,http://web.archive.org/web/20030410205824/http://msdn.microsoft.com/library/en-us/dnwxp/html/xptheming.asp".

Notice of Allowance in U.S. Appl. No. 11/111,735 mailed Jul. 30, 2008 pp. 39.

Final Office Action in U.S. Appl. No. 11/111,735 mailed Apr. 15, 2008 pp 38.

Office Action in U.S. Appl. No. 11/111,735 mailed Sep. 4, 2007 pp. 22.

Notice of Allowance in U.S. Appl. No. 11/112,601 mailed Apr. 1, 2008 pp. 15.

Final office Action in U.S. Appl. No. 11/112,601 mailed Apr. 1, 2008 pp. 8.

Office Action in U.S. Appl. No. 11/112,601 mailed Jul. 27, 2007 pp. 13.

Notice of Allowance in U.S. Appl. No. 11/112,602 mailed Jan. 27, 2009 pp. 19.

Final Office Action in U.S. Appl. No. 11/112,602 mailed May 30, 2008 pp. 22.

Office Action in U.S. Appl No. 11/112,602 mailed Dec. 21, 2007 pp. 13.

Final Office Action in U.S. Appl. No. 11/111,734 mailed Jan. 6, 2009 pp. 17.

Office Action in U.S. Appl. No. 11/111,734 mailed Jul. 14, 2008 pp. 17.

European Search Report in application 06739224.1-1225 mailed Aug. 10, 2010 pp. 8.

EP Official Communication mailed Aug. 27, 2010.

"Duval E et al: "Metadata Principles Andpracticalities"Internet Citation vol. 8, No. 4, Apr. 1, 2002, XP002456980ISSN: 1082-9873 D O I:10.1045/april2002-weibelRetrieved from the Internet:URL: http://www.dlib.org/dlib/april02/weibe1/04weibel.html[retrieved on 2007-10-301".

"Derose S et al: "XML Linking Language(XLink) Version 1.0"Internet CitationJun. 27, 2001, XP002243729Retrieved from the Internet:URL:http://www.w3.org/TR/2001/REC-xlink-20010627[retrieved on 2003-06-061".

"Wilde E et al: "From content-centered publishing t o a link-based view of information resources"System Sciences, 2000. Proceedings of The33rd Annual Hawaii International Conference on Jan. 4-7, 2000, Piscataway,NJ, USA, I EEE, Jan. 4, 2000, pp. 824-833, XP010545318ISBN: 978-0-7695-0493-3* p. 4, right-hand column, lin e 4—p. 7, left-hand column, lin e 16 ".

"Gronbaek K et al: "Open hypermedia as user controlled meta data f o r the Web"Computer Networks, Elsevi er Sciencepublishers B.V., Amsterdam, NL LNKDDO1: IO.1016/S1389-1286 (00) 00070-0, vol. 33, No. 1-6, Jun. 1, 2000, pp. 553-566, XP004304791ISSN: 1389-1286".

"EP 1 126 387 A2 (Empolis UK Ltd [GB]) Aug. 22, 2001" .

Office Action mailed Nov. 24, 2010 in Chinese Patent Application 200680011141.7, 10 pages.

\* cited by examiner 310   315
<Relationships xmlns = "http://mmcfrels-PLACEHOLDER>

<Relationship>
        ID = "FFC797514BC"   325
320        Type = "http://mmcf-printing-ticket/PLACEHOLDER   326
        Target = ". . /tickets/ticket1.xml
    </Relationship>   327

<Relationship>
        ID = "EFC797514BC"   325
320        Type = "http://PLACEHOLDER-olmaage
        Target = ". /images/my_house.jpg   326
    </Relationship>   327

<Relationship>   326
        ID = "EFC627517BC"   325
320        Type = "http://www.custom.com/REQUIRED.RESOURCES"
        Target = "http://www.custom.com/images/pic1.jpg"
        TargetBase="external"   327
    </Relationship>   328

.
    .
    .

</Relationships>
310

FIG. 3

EFFICIENTLY DESCRIBING RELATIONSHIPS BETWEEN RESOURCES

CROSS-REFERENCE TO RELATED APPLICATION

The present application is related to co-pending application, Ser. No. 11/111,735, filed Apr. 22, 2005, entitled "Pack URI Scheme to Identify and Reference Parts of a Package".

STATEMENT REGARDING FEDERALLY SPONSORED RESEARCH OR DEVELOPMENT

Not applicable.

FIELD OF THE INVENTION

The present invention relates generally to relationship management. Specifically, a system and method are provided to discover relationships between resources by referring to a relationship data structure.

BACKGROUND OF THE INVENTION

Currently, documents such as, web pages, images and movies are generally encoded in two types of encoding including content-specific and application-specific encoding. A document may include relationship information that defines a relation between the document and another document. The relationship information is encoded in the content-specific or application-specific encoding of the document.

A decoder must know how the document is encoded to extract the relationship information. The decoder extracts the relationship information within a document by decoding the entire document and extracting the relationship information. The relationship information will not be extracted when the decoder does not understand the encoding of the document.

A problem is created when the decoder attempts to view or update the relationship information in a secure document that is encrypted or digitally signed. If the secure document is encrypted, the decoder will be unable to decode the secure document and extract the relationship information in the document because the decoder does not know how the secure document and the relationship information are encoded. Moreover, when the secure document is digitally signed the decoder will be able to decode the secure document and extract the relationship information. However, decoding the document and extracting the relationship information may invalidate the digital signature because decoding the document and extracting the relationship information may change a document attribute tracking a date the document was last accessed.

Therefore, for at least the foregoing reasons, a method to quickly discover internal and external relationships of a document without decoding the document is needed.

SUMMARY OF THE INVENTION

These and other problems, in the art, are solved by providing a relationship data structure that enables discovery of one or more relationships between a source resource and one or more target resources, without decoding the source or target resources.

A relationship data structure is stored on a computer-readable medium and describes one or more relationships between the source resource and the one or more target resources. Each relationship of the relationship data structure comprises identification information to uniquely identify a relationship between the source resource and a target resource of the one or more target resources, target information to specify a location of the target resource, and type information to define the semantics of the relationship between the source and the target resource.

Also, a relationship data structure is associated with a source resource to enable a method to describe a plurality of relationships between a source resource and a plurality of target resources, the plurality of relationships being encoded in a format independent of a source resource's or target resource's encoding. The method to describe the plurality of relationships includes selecting a namespace that defines a relationship schema, populating the relationship data structure based on the plurality of relationships and the relationship schema, and storing the plurality of relationships in the relationship data structure.

Moreover, a relationship data structure enables a method to discover one or more relationships between a source resource and one or more target resources. To discover the one or more relationships, a location of the source resource is determined. Subsequently, the location of the source resource is employed to ascertain whether a relationship data structure is associated with the source resource. If the relationship data structure is associated with the source resource, the one or more relationships are decoded in accordance with a relationship schema, and the one or more decoded relationships are displayed.

Accordingly, a relationship data structure provides access to relationships between a source resource and a plurality of target resources without decoding the source or target resources. The relationship data structure facilitates faster communication with disparate systems because the relationships are faster to resolve and may be stored in a content-neutral format.

Additional advantages and novel features will be set forth in the description which follows and in part may become apparent to those skilled in the art upon examination of the following or may be learned by practice of the invention.

BRIEF DESCRIPTION OF THE DRAWINGS

The present invention is described in detail below with reference to the attached figures, wherein:

FIG. 3 illustrates a relationship data structure utilized by the present invention;

DETAILED DESCRIPTION OF EMBODIMENTS

An embodiment of the present invention utilizes a relationship data structure to discover one or more relationships between a source resource and one or more target resources. The source and target resources may be packages addressable using a pack protocol as described in "Pack URI Scheme to Identify and Reference Parts of a Package." The relationship data structure is associated with the source resource and is stored in a content-neutral format.

Figure 1:
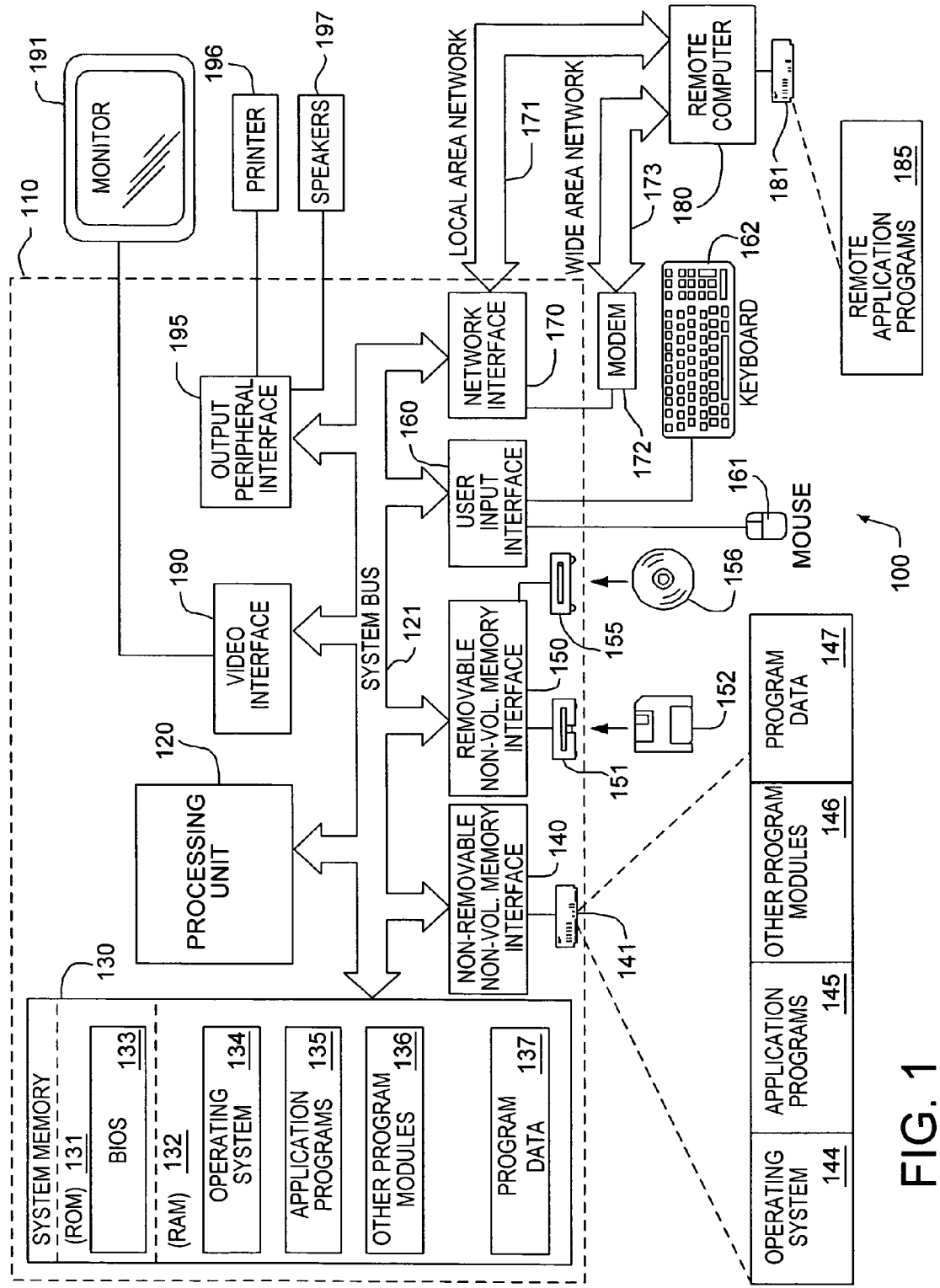
FIG. 1 is a block diagram that illustrates a computing environment adapted to implement the present invention.

FIG. 1 is a block diagram that illustrates a computing environment adapted to implement the present invention. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

The present invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect Express (PCI Express) and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the processing unit 120 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
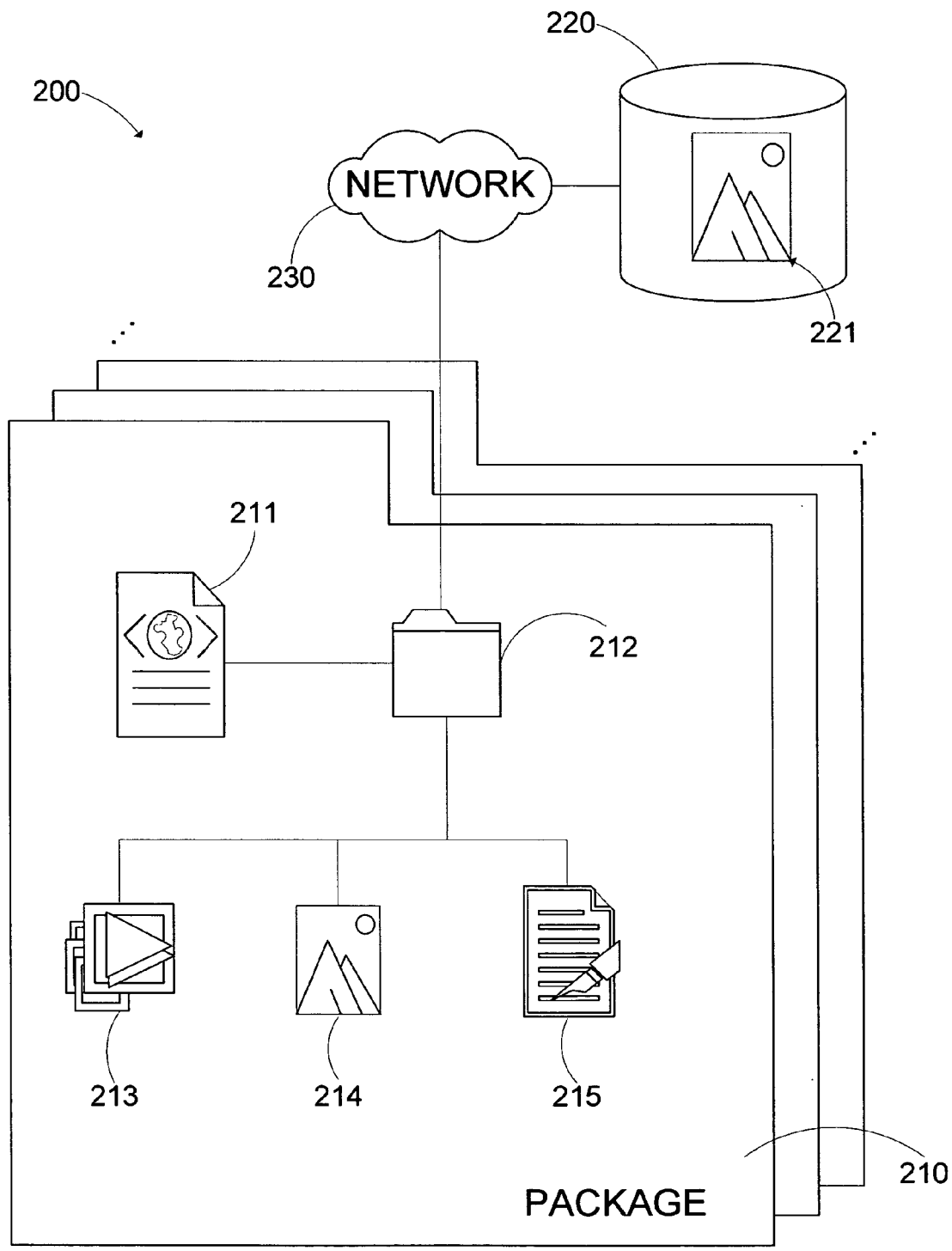
FIG. 2 illustrates a package stored in a network environment, and a plurality of relationships between a source resource and a plurality of target resources.

FIG. 2 illustrates a package 210 stored in a network environment 200, and a plurality of relationships between a source resource 211 and a plurality of target resources 213-215 and 221.

With reference to FIGS. 1 and 2, the package 210 is stored on the computer 110. The computer 110 stores a plurality of other packages at addresses relative to the current location of package 210. The package 210 is a container that stores the source resource 211, the relationship resource 212, and the target resources 213-215. The package 210 may also contain a plurality of other source resources and target resources (not shown).

The source resource 211 may be a file such as, for example, an image, a web page, a document, a video or a package similar to package 210. The source resource 211 is related to the target resources 213-215 and 221. Although not shown, the source resource 211 may also be related to a target resource contained in a package that is relative to package 210. The source resource 211 is associated with the relationship resource 212. The source resource 211 is a resource from which a relationship originates.

The target resources 213-215 and 221 may be files such as, for example, image files, web pages, documents, videos or packages similar to package 210. The target resources 213-215 are local resources with respect to source resource 211, whereas the target resource 221 is an external resource stored on the remote computer 180, accessible via network 230. The target resource 221 is stored in a database 220 on the remote computer 180. The target resources 213-215 and 221 are resources where the relationship terminates. However, the target resources 213-215 and 221 may take on characteristics associated with the source resource when the target resource is associated with a relationship resource similar to the relationship resource 212.

The relationship resource 212 stores information indicating that the source resource 211 is related to target resources 213-215 and 221. This information is called relationship information and may be used to construct a resource hierarchy or to provide metadata about the source resource 211. Further detail of the relationship resource 212 is disclosed below with reference to FIG. 3.

FIG. 3 illustrates a relationship data structure 300 utilized by the present invention. With reference to FIGS. 2 and 3, the relationship data structure 300 defines the relationship resource 212. A relationships tag 310 defines a plurality of relationships between a source resource and a plurality of target resources. The relationships tag 310 may include a namespace element 315 to define a schema and semantics for the plurality of relationships. The schema and semantics may define a content-neutral encoding for the relationship data structure.

A relationship tag 320 defines a single relationship between the source resource and a target resource of the plurality of target resources. A plurality of relationship tags 320 may be nested within the relationships tag 310. The relationship tag 320 includes an identification element 325, a type element 326, a target element 327 and a targetBase element 328.

The identification element 325 uniquely identifies the relationship within the relationships tag 310. The identification element 325 cannot change and must be a valid identifier, such as an extensible Markup Language (XML) identifier. The validity of the identifier is verified according to the schema specified by the namespace element 315, such as, for example, a XML schema.

The type element 326 may be constrained to a range of values specified by the namespace element 315 or by an application program. The type element 326 further defines the semantics of the relationship. For example, the type element 326 may define whether a source resource requires or needs the target resource.

Similar to the type element 326, the targetBase element 328 further defines the semantics of the relationship between the source resource and the target resource. The targetBase element 328 may define whether the target resource is internal, local, relative or external.

The target element 327 defines the location of the target resource. The location may be an address identifier such as a Pack Uniform Resource Identifier (URI), an absolute Uniform Resource Locator (URL), or a relative URL. A Pack URI is an addressing scheme utilized to reference a package. The Pack URI addressing scheme enables requests for an entire package or for a particular resource contained in the package. A detailed description of the Pack URI addressing scheme is disclosed in a co-pending application entitled "Pack URI Scheme to Identify and Reference Parts of a Package," which has been incorporated by reference.

Therefore, the relationship data structure 310 enables a user to discover and describe relationships to target resources that are local, within the package, external, target resources that a located at an absolute position, outside the package, on a different computer, and relative, target resource that are located at a position relative to the package. Moreover, the relationship data structure 310 provides a location to store source resource metadata. The metadata information includes annotations and descriptive data, such as print or display data.

Figure 4:
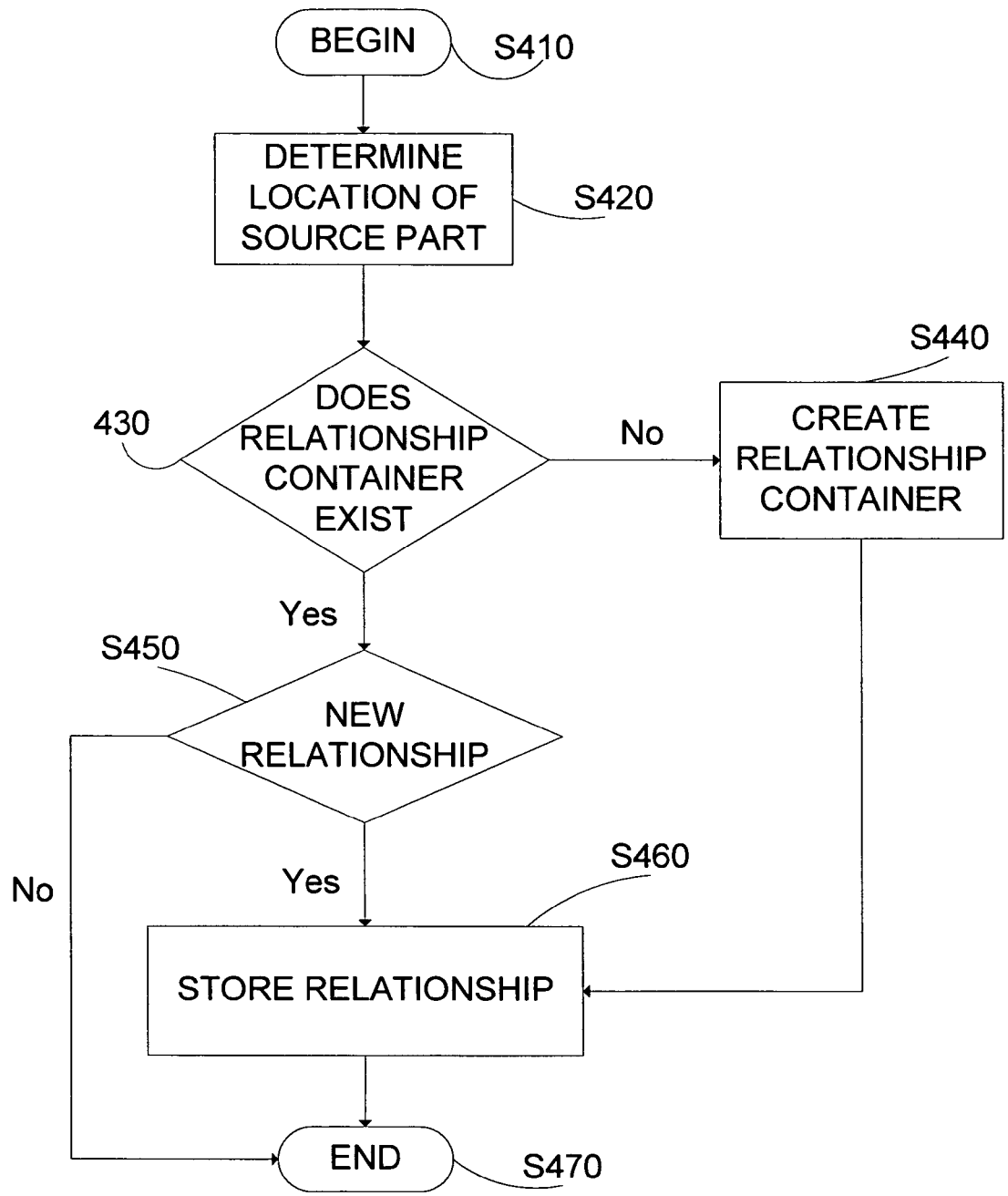
FIG. 4 is a flow chart, of an embodiment of the present invention, which illustrates a method to create the relationship data structure of FIG. 3.

FIG. 4 is a flow chart, of an embodiment of the present invention, which illustrates a method to create the relationship data structure 310 of FIG. 3. In step S410 an application or user generates a request to add a relationship to a source resource. Next, in step S420, the location of the source resource is determined. Upon determining the location of the source resource, in step 430, a check is initiated to verify the existence of the relationship data structure. If the relationship data structure exists, in step S450, a subsequent check is made to verify that the relationship is new. If the relationship is new or has been modified, it is stored in the relationship data structure, otherwise the relationship is a duplicate relationship and it is not stored. In an alternate embodiment the relationship is stored according to the schema and semantics specified by the namespace element 315.

If the relationship data structure does not exist, in step S440 a relationship data structure is instantiated and associated with the source resource. The relationship data structure may be associated with the source resource by creating a container, such as, a folder, at a location relative to the location of the source resource. Subsequently, the relationship data structure is stored in the container. In an embodiment of the present invention, if the source resource is located at, for example, /content/spine.xml, the relationship data structure would be instantiated at /content/_rels/ and named "spine.xml.rels." To adhere to this naming convention the relationship data structure may be stored in a sub-container, referred to as "_rels," located at the location of the source resource, and the name of the relationship data structure would be the name of the source resource concatenated with ".rels." Using a similar naming convention to associate all relationship data structures with all source resources would allow efficient access to the relationship data structures based on the location of the source resources.

After the relationship data structure is instantiated, the relationship data structure is populated with relationship information, such as, for example, identification, target or type information. This relationship information is then stored, in step 460, to allow subsequent retrieval of the relationship information.

Figure 5:
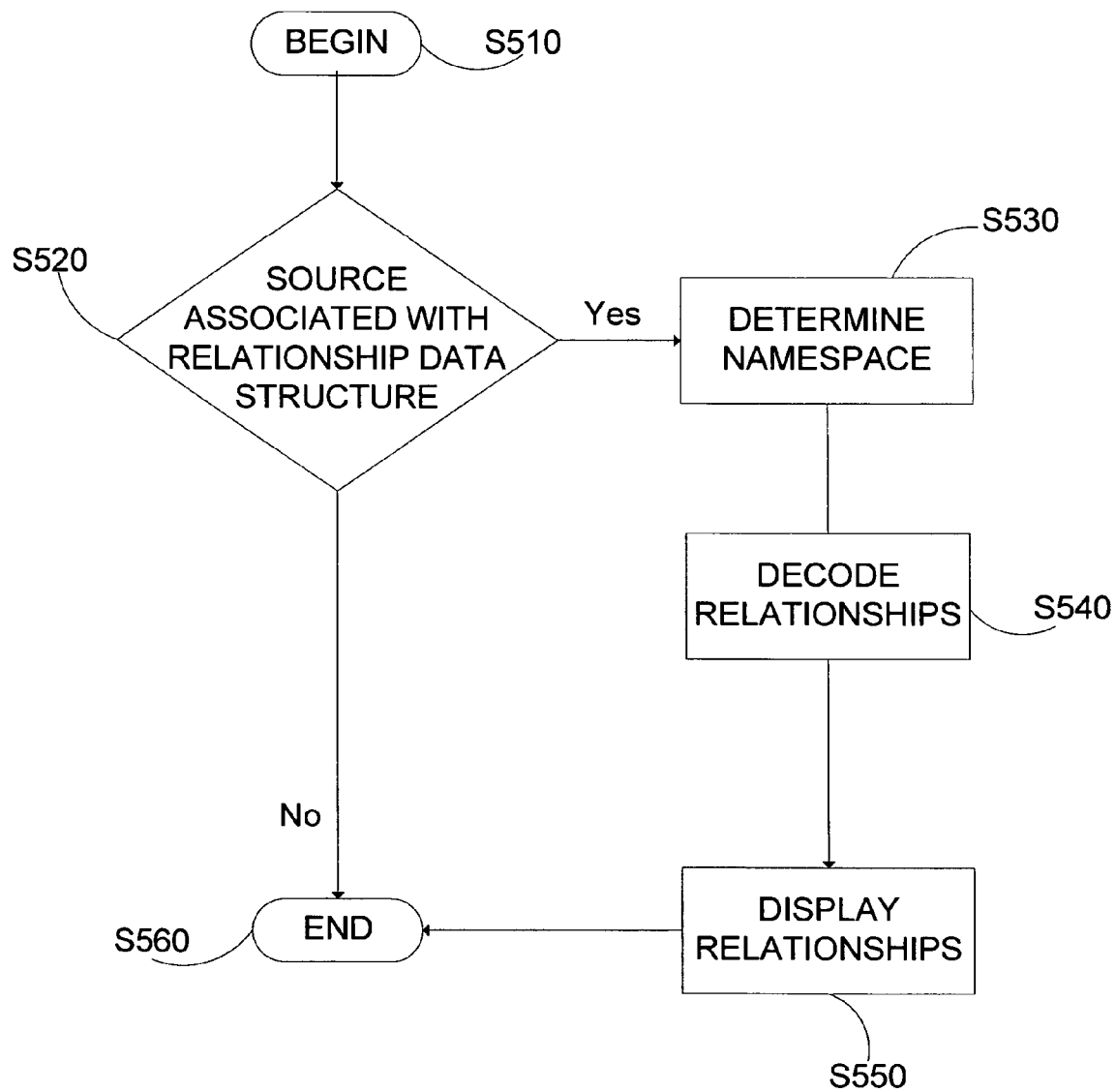
FIG. 5 is a flow chart, of an embodiment of the present invention, which illustrates a method to discover one or more relationships by referring to the relationship data structure of FIG. 3.

FIG. 5 is a flow chart, of another embodiment of the present invention, which illustrates a method to discover one or more relationships by referring to the relationship data structure of FIG. 3.

In response to a user or application relationship request to decode the relationship data structure, step S510, a check is made to ascertain whether the source resource is associated with the relationship data structure, in step S520. If the source resource is not associated with a relationship data structure, the relationship data structure is not decoded. One the other hand, if the relationship data structure exists the namespace for the data structure is determined, in step S530. Then, in step S540, a decoder or reader decodes the relationships. After decoding, the one or more relationships may be displayed in step S550. In an alternate embodiment the decoding of the relationship utilizes the schema and semantic specified by the namespace element 315.

Accordingly, a source resource related to a plurality of target resources will have a plurality of relationships that will be discovered according to the method described above. Additionally, embodiments of the present invention enable a decoder to decode the plurality of relationships associated with the source resource without decoding the source resource. The decoder can decode relationships when the content encoding of the plurality of relationships are in a format different from the source or target resources encoding. Thus, a relationship between secure or encrypted source and target resources can be determined without breaching the security of the secure or encrypted source and target resources.

The foregoing descriptions of the invention are illustrative, and modifications in configuration and implementation will occur to persons skilled in the art. For instance, while the present invention has generally been described with relation to FIGS. 1-5, those descriptions are exemplary. Accordingly, the scope of the invention is to be limited only by the following claims.

We claim:

1. A method to describe a plurality of relationships between a source resource and a plurality of target resources, the plurality of relationships encoded in a format independent of an encoding of the source resource, the method comprising:
   selecting a namespace that defines a relationship schema between an encrypted source resource where the relationship originates and at least one related encrypted target resource from a plurality of target resources where the relationship terminates, wherein the relationship schema is encoded in a format that is independent of the encrypted source resource's encoding and the at least one related encrypted target resource from a plurality of target resources' encoding, wherein the relationship schema can be decoded without decoding the encrypted source resource or the at least one related encrypted target resource;
   storing the encrypted source resource, the relationship schema, and the at least one related encrypted target resource in a package;
   populating a relationship data structure based on the plurality of relationships and the relationship schema;
   storing the plurality of relationships in the relationship data structure; and
   associating the relationship data structure with the encrypted source resource, wherein associating the relationship data structure with the encrypted source resource comprises:
   creating a container at a location relative to the encrypted source resource; and
   storing the relationship data structure in the container.

2. The method according to claim 1, wherein the plurality of target resources are resources selected from a group consisting of local, external and relative resources.

3. The method according to claim 1, wherein populating the relationship data structure further comprises:
   retrieving identification information that identifies the plurality of relationships; and
   validating the retrieved identification information by utilizing the relationship schema.

4. The method of claim 3, wherein the relationship schema comprises an XML schema.

5. The method according to claim 1, wherein the address relative to the location of the source resource addresses a subfolder at the location of the source resource.

6. The method of claim 1, wherein the relationship data structure comprises metadata to describe the encrypted source resource.

7. The method of claim 1, further comprising: storing another related encrypted target resource in a second package, wherein the package and the second package are related.

8. A method to discover a plurality of relationships between a source resource and a plurality of target resources, the plurality of relationships encoded in a format independent of an encoding of the source resource or the plurality of target resources, the method comprising:
   locating the source resource where a relationship originates, and locating a related target resource where the relationship terminates;
   determining whether a relationship data structure comprising hierarchy-structured relationship information is associated with the located source resource, wherein determining whether the relationship data structure is associated with the source resource further comprises: checking for an existence of a subfolder at a location of the source resource, wherein the subfolder stores source resource metadata and is located at an address relative to the location of the source resource;
   decoding the plurality of relationships without decoding the source resource or the related target resource, wherein decoding the plurality of relationships without decoding the source resource further comprises:
    prior to decoding the plurality of relationships, determining a schema of the relationship data structure identified by a namespace associated with the relationship data structure and
    utilizing the schema to decode the plurality of relationships stored in the relationship data structure; and
    displaying the plurality of relationships.

9. The method according to claim 8, wherein the source resource or the plurality of target resources are encrypted resources.

10. The method according to claim 8, wherein the source and the plurality of target resources are addressed using a Pack URI.

11. The method of claim 8, wherein the relationship data structure comprises metadata to describe the source resource.

12. The method of claim 8, further comprising: adding a new relationship to the source resource.

13. The method of claim 12, further comprising: storing the new relationship in the relationship data structure.

14. A computer-storage medium storing a relationship data structure that provides data corresponding to a plurality of relationships between a source resource and a plurality of target resources, the relationship data structure comprises:
    identification information to uniquely identify each relationship of the plurality of relationships;
    target information for each identified relationship to specify a location of each target resource of the plurality of target resources where a relationship terminates, which is related to the source resource where the relationship originates, wherein the plurality of identified relationships stored in the relationship data structure are nested;
    semantic information to assist a decoder when decoding the identified relationship of the plurality of relationships, wherein content encoding format of the plurality of relationships differs from the source resource content encoding format and the plurality of target resources content encoding formats, and the plurality of relationships can be decoded without decoding the source resource or any of the plurality of target resources; and
    a relationship data structure comprising one or more relationship tags to define the identified relationship between the source resource and the target resource, wherein each of the one or more relationship tags comprise an identification element, a type element, and a target element.

15. The computer-storage medium storing the relationship data structure of claim 14, wherein the relationship data structure includes metadata to describe the source resource.

16. The computer-storage medium of claim 14, wherein the target element defines a location of the at least one related encrypted target resource, the location comprising one or more of a pack Uniform Resource Identifier (URI), an absolute Uniform Resource Locator (URL), or a relative URL.

* * * * *